(12) United States Patent
Gavish et al.

(10) Patent No.: US 6,915,871 B2
(45) Date of Patent: Jul. 12, 2005

(54) METHOD AND APPARATUS FOR IMPROVING CHILD SAFETY AND ADULT CONVENIENCE WHILE USING A MOBILE RIDE-ON TOY

(76) Inventors: Dan Gavish, 4, Harakafot Street, Haifa (IL), 34745; Hanna Gavish, 4, Harakafot Street, Haifa (IL), 34745

( * ) Notice: Subject to any disclaimer, the term of this patent is extended or adjusted under 35 U.S.C. 154(b) by 142 days.

(21) Appl. No.: 10/371,576

(22) Filed: Feb. 24, 2003

(65) Prior Publication Data

US 2003/0174085 A1 Sep. 18, 2003

Related U.S. Application Data

(60) Provisional application No. 60/363,255, filed on Mar. 12, 2002.

(51) Int. Cl.[7] .............................................. B60T 7/00
(52) U.S. Cl. ...................................... 180/167; 180/169
(58) Field of Search ............................... 180/65.1, 908, 180/167, 169; 446/454, 456

(56) References Cited

U.S. PATENT DOCUMENTS

| 5,150,027 | A | * | 9/1992 | Suzuki | 318/581 |
|---|---|---|---|---|---|
| 5,184,694 | A | * | 2/1993 | Magrath et al. | 180/167 |
| 5,439,071 | A | * | 8/1995 | Rodriguez-Ferre | 180/167 |
| 5,816,352 | A | * | 10/1998 | Hacker | 180/167 |
| 5,924,507 | A | * | 7/1999 | Prather | 180/167 |
| 6,142,251 | A | * | 11/2000 | Bail | 180/167 |
| 6,771,034 | B2 | * | 8/2004 | Reile et al. | 318/139 |

* cited by examiner

Primary Examiner—Christopher P. Ellis
Assistant Examiner—Brian L Swenson (57) ABSTRACT

A method and apparatus by which an adult accompanying a child riding a mobile ride-on toy, can continuously determine if the child is free to fully operate the toy, or else, the adult can force the toy to slow down, and/or to stop, and/or to otherwise control the ride-on toy in order to protect the child's safety, is disclosed. The adult can gain control as specified above, by operating a wireless remote-control unit. Furthermore, the adult can limit the distance between the ride-on toy and the adult, so that the child cannot drive too far away from the adult, i.e., the toy automatically stops as soon as the predetermined range limit is reached. Also, the ride-on toy can be used as long as it is under the control of the adult, but it automatically stops when the adult loses control over the ride-on toy.

16 Claims, 7 Drawing Sheets

Overall Functional Block Diagram

FIGURE 1: Overall Functional Block Diagram

FIGURE 2: An example of embodiment of the controlling device and of the wireless remote control unit FIGURE 3: A second example of embodiment of the controlling device and of the wireless remote control unit FIGURE 4: A third example of embodiment of the controlling device and of the wireless remote control unit FIGURE 5: A forth example of embodiment of the controlling device and of the wireless remote control unit FIGURE 6: Control Interface - First Example of embodiment FIGURE 7: *Control Interface* - Second Example of embodiment

METHOD AND APPARATUS FOR IMPROVING CHILD SAFETY AND ADULT CONVENIENCE WHILE USING A MOBILE RIDE-ON TOY

We hereby claim the benefit of the following earlier application: U.S. Provisional Patent Application No. 60/363,255, filed on Mar. 12, 2002 by Dan Gavish and Hanna Gavish, entitled "Method And Apparatus For Improving Child Safety And Adult Convenience While Using a Mobile Ride-On Toy". This earlier application is hereby entirely incorporated by reference.

REFERENCE TO RELATED APPLICATIONS

U.S. Patent documents:
  5,439,071 August, 1995 Rodriguez-Ferre 180/167
  5,924,507 July, 1999 Prather 180/167
U.S. Provisional Patent Application:
  60/363,255 March/2002 Gavish & Gavish

FIELD OF THE INVENTION

The present invention relates to the field of children's toys and amusement devices. In particular, the invention presents a method and apparatus for improving child safety and accompanying adult convenience when the child is using a ride-on toy such as: a riding toy-car, a riding toy-tricycle, a riding toy-tractor, a riding toy-motorcycle, a riding toy-jeep, a riding toy-horse, a riding toy-sheep, or any other shape of a ride-on toy. The ride-on toy could be foot powered, or battery powered, or gasoline powered, or otherwise powered.

BACKGROUND OF THE INVENTION

While mobile ride-on toys cause young children a lot of fun, such toys some times can be dangerous. The adult accompanying the child riding the toy would wish to gain some control over the ride-on toy in order to protect the child's safety, and to increase the accompanying adult's convenience, while still leaving the child enough freedom to enjoy the toy. It would be a lot more desirable if the adult accompanying the child riding a ride-on toy, can gain the said control by using a wireless remote-control unit. It would be desired if with said wireless remote-control unit, the adult can force the said ride-on toy to slow down, and/or to stop, and/or to otherwise control the ride-on toy in order to protect the child from hazards.

PRIOR ART

U.S. Pat. No. 5,439,071 issued to Rodriguez-Ferre, entitled "Child's toy vehicle having a safety device", describes a toy vehicle having a receiver circuit which may be enabled by an electromagnetic signal emitted by a remote control, handled by an adult. One drawback of the aforesaid patent is the need to transmit the electromagnetic signal continuously in order to enable the use of the toy. This means that the adult needs to continuously hold the button on the remote control, and also, the remote control battery is being drained very fast, which makes it impractical for use. To enable continuous use of the toy without continuously transmitting the electromagnetic signal by the remote control, a functional selection switch needs to be installed on the vehicle, which means not only additional hardware cost, but also reduced ease of use. Another drawback of the aforesaid patent is lack of ability for the adult to automatically limit the distance between the ride-on toy and the said adult in order to prevent the child from driving too far away from the adult.

U.S. Pat. No. 5,924,507 issued to Prather, entitled "Powered toy vehicle with containment system", describes a toy vehicle with containment system including a radio antennae perimeter defining system. Perimeter defining radio transmitter pylons are installed to define a containment area within which a child can drive. Each pylon is equipped with a radio transmitter circuit, a battery, and a directional antennae. The need to install those pylons, as well as their costs, are drawbacks of that patent.

All the aforesaid drawbacks related to the aforesaid prior patents, as well as other existing drawbacks, are resolved with the current disclosed invention, and other advantages are introduced, as will become apparent.

SUMMARY AND OBJECT OF THE INVENTION

It is one of the objects of the present invention to increase the level of safety for a child while riding a ride-on toy.

It is a further object of the present invention to improve the convenience of an adult accompanying the said child.

It is a further object of the present invention to allow said accompanying adult to gain some control over the ride-on toy used by a child.

It is a further object of the present invention to limit the distance between the ride-on toy and the said adult, so that the child cannot drive too far away from the adult.

It is a further object of the present invention to, enable the ride-on toy to be used as long as it is under the control of said adult, but to automatically stop it when the said adult loses control over the ride-on toy.

It is a still further object of the invention to provide an apparatus and a method that accomplishes some or all of the above objects in combination.

These and other objectives are advantageously achieved by the method and apparatus of the present invention.

The present invention consists of a toy control unit installed within a ride-on toy (said ride-on toy being ridden by a child) along with a wireless remote control unit operated by an accompanying adult. By operating the said wireless remote control unit, the accompanying adult can advantageously determine if the child is free to fully operate the ride-on toy, or else, the said adult can force the said ride-on toy to slow down, and/or to stop, and/or to otherwise control the ride-on toy in order to protect the child's safety. The said wireless remote control unit may look similar to a conventional wireless remote control unit of a garage door opener device, or of a car alarm system, or of a TV set, or any other embodiment of a wireless remote control unit. The wireless remote control unit may be so designed that said adult may hold the wireless remote control unit in his or her hand, or in a pocket, or use a strap to hang it on the neck, or wear it on the wrist like a watch, or any other embodiment.

Said wireless remote control unit communicates with the said toy control unit using any kind of wireless communication. For example, an RF (radio frequency) communication, or, an IR (infrared) communication, or, any other type of wireless communication may be applied.

The said toy control unit, installed within the ride-on toy, receives signals from the said wireless remote control unit, and accordingly controls the mechanism of the ride-on toy, so that it can either be used freely, or stop, or slow down, or other control directions. For example, slowing down or stopping can be achieved by eliminating or reversing the electrical current to the motor, or by reducing the electrical current or voltage applied to the motor, or by applying an electro-mechanical safety break. However, other ways of controlling the ride-on toy can be applied.

The wireless remote control unit, with the toy control unit, may be designed in such a way so that selected "Essential" control function instructions (e.g., "stop" instruction) will operate over a distance that is longer than a maximal distance allowed for "non essential" control function instructions (e.g., "go" instruction) to operate. This optional advantage assures that in case of a weak reception of transmitted wireless signals (e.g., due to marginally weak battery, or for any other reason), the "non-essential" control function instructions will be lost first, while the "essential" control function instructions will still operate properly, to advantageously enhance safety.

The toy control unit may be designed in such a way so that if it loses communication with the wireless remote control unit (due to distance, or screening, or low battery power, or for any other reason), then it advantageously stops the ride-on toy. Likewise, the toy control unit may be so designed that if the distance between the ride-on toy and the wireless remote control unit exceeds a predetermined range limit, it advantageously stops the ride-on toy. Furthermore, the accompanying adult can fix the said predetermined range limit.

These and other objects, features, and advantages of the present invention will be apparent to one skilled in the art in view of the descriptions and drawings which follow below.

BRIEF DESCRIPTION OF THE DRAWINGS

The present invention will be described by examples of embodiments, but not limitations, illustrated in the accompanying drawings, in which.

DETAILED DESCRIPTION OF THE INVENTION

We hereby present a method and apparatus by which an adult accompanying a child riding a mobile ride-on toy, can continuously determine if the child is free to fully operate the ride-on toy, or else, the said adult can force the said ride-on toy to slow down, and/or to stop, and/or to otherwise control the ride-on toy in order to protect the child's safety. Said adult can gain control as specified above, by operating a wireless remote-control unit. Furthermore, said adult can limit the distance between the ride-on toy and the said adult, so that the child cannot drive too far away from the adult, i.e., the toy automatically stops as soon as the predetermined range limit is reached. Also, the ride-n toy can be used as long as it is under the control of said adult, but it automatically stops when the said adult loses control over the ride-on toy.

In the following description, for purpose of explanation, specific nomenclature is set forth to provide a thorough understanding of the present invention. However, it will be apparent to one skilled in the art that these specific details arc not required in order to practice the present invention. In other instances, well known circuits and devices are shown in block diagram form in order not to obscure the present invention.

The invention will be described by examples of embodiments, but not limitations, illustrated in the accompanying drawings. However, it will be apparent to one skilled in the art that these examples of embodiments are not required in order to practice the present invention, namely, other embodiments of the said invention may be practiced without departing from what is regarded to be the subject matter of the invention.

Figure 1:
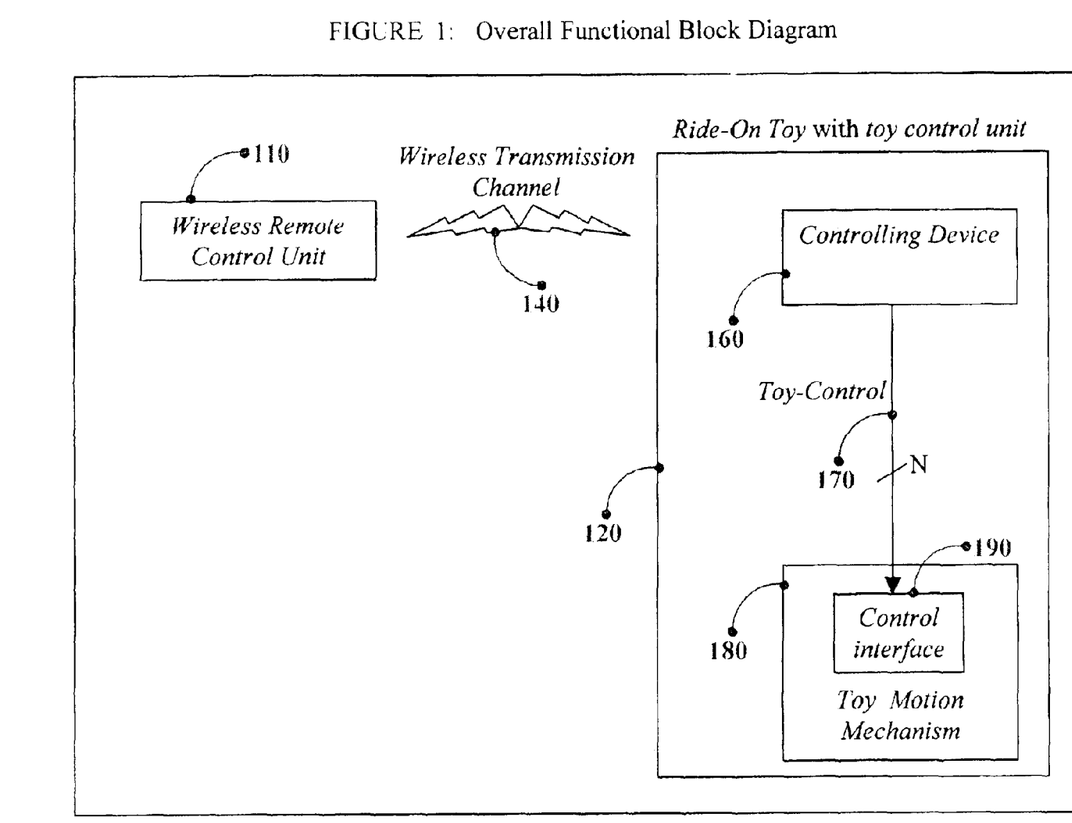
FIG. 1 illustrates an overall block diagram of the invention.

FIG. 1:

FIG. 1 presents an example of an overall functional block diagram of the invention. A toy control unit, which is embedded into the otherwise conventional ride-on toy 120, consists of two sub-units: a Controlling Device 160, and a Control interface 190. The Controlling Device 160 is embedded into the otherwise conventional ride-on toy 120. Also, a Control interface 190 is embedded into the otherwise conventional Toy Motion Mechanism 180 of the ride-on toy 120. The user activates a Wireless Remote Control Unit 110. The said Wireless Remote Control Unit 110 communicates with the Controlling Device 160 via a Wireless Transmission Channel 140. For example, said Wireless Transmission Channel 140 may utilize an RF (Radio Frequency) transmission, or an IR (Infra Red) transmission, or an ultra-sonic transmission, or any other method of wireless transmissions. The Controlling Device 160 receives the instructions applied by the Wireless Remote Control Unit 110 via the Wireless Transmission Channel 140. Accordingly, the Controlling Device 160 applies the Toy-Control set of signals 170 to the Control interface 190 which consequently controls the otherwise conventional Toy Motion Mechanism 180 of the ride-on toy 120.

Figure 2:
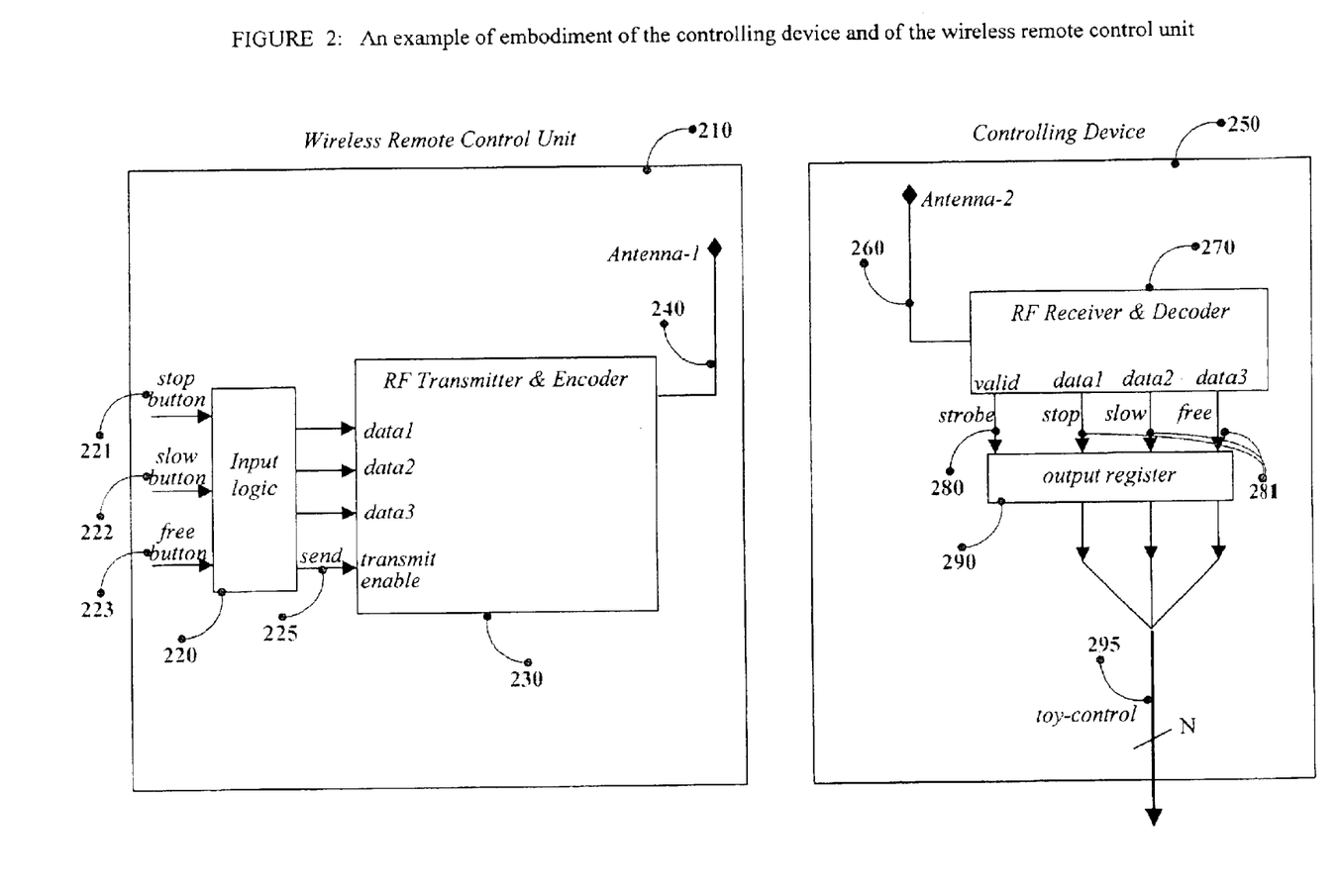
FIG. 2 represents an example of an embodiment of the controlling device and of the wireless remote control unit, in which "stop", "slow", or "free" signals are transmitted from the wireless remote control unit to the controlling device.

FIG. 2:

FIG. 2 represents an example of an embodiment of the controlling device 250 and of the wireless remote control unit 210, in which "stop", "slow", or "free" signals are transmitted from the wireless remote control unit 210 to the controlling device 250. Several buttons are installed on the wireless remote control unit 210, such as the Stop button 221, the Slow button 222, and the Free button 223. The user activates the said buttons in order to force the ride-on toy to stop, or to force the ride-on toy to slow down, or to enable the child a fill control over the ride-on toy (namely, to give the child the freedom to drive the toy as he or she wishes), respectively. The signals related to the said buttons are applied to the Input logic circuit 220. The Input logic circuit 220 consequently applies the said three signals to the data inputs of the RF Transmitter & Encoder circuit 230. In addition, Input logic circuit 220, upon activation of any of the said buttons, generates a send pulse 225 and applies it to the transmit enable input of the RF Transmitter & Encoder circuit 230. Consequently, the RF Transmitter & Encoder circuit 230, via Antenna-1 240, broadcasts an RF transmission, in which the information related to the specific activated button is encoded.

Said RF transmission reaches the controlling device 250, and is received by the RF Receiver & Decoder circuit 270 via Antenna-2 260. The RF Receiver & Decoder circuit 270 decodes the received information, and accordingly asserts one of its output signals 281 stop, slow, or free. In addition, the RF Receiver & Decoder circuit 270, upon decoding of said information, generates a strobe pulse 280 via its valid output. Said strobe pulse 280, along with the ad stop,slow, free set of signals 281, are applied to the output register-circuit 290. Upon detection of the strobe pulse 280, output register circuit 290 samples the stop,slow,free set of signals 281 and stores them. Consequently, said stored signals are applied via the toy-control set of output signals 295.

Implementation of all said circuits of this example of embodiment will be apparent to one skilled in the art. To ease the detailed design process, commercially available components may be used to implement the RF Transmitter & Encoder circuit 230. Likewise, commercially available components may be used to implement the RF Receiver & Decoder circuit 270.

Figure 3:
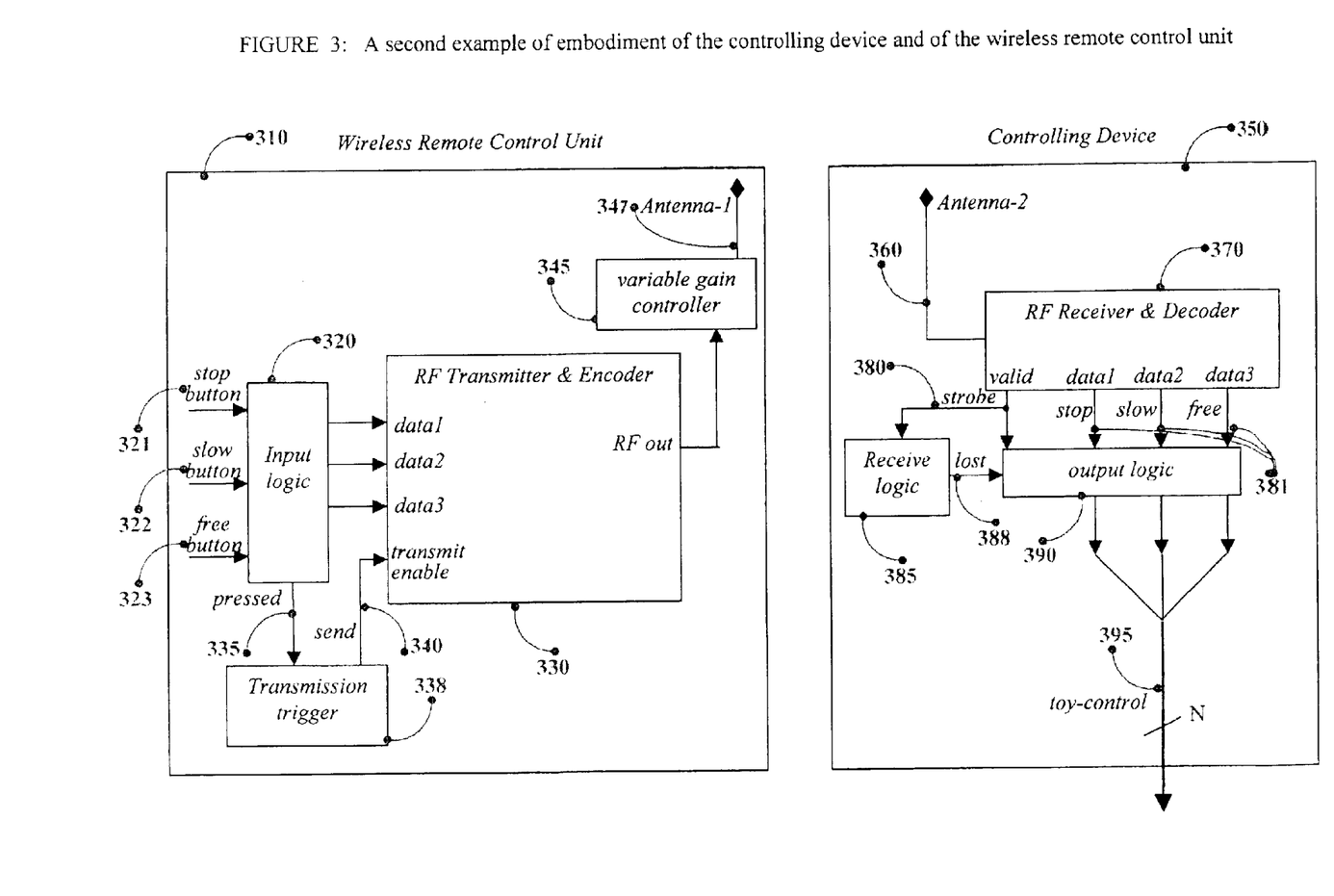
FIG. 3 represents a second example of an embodiment of the controlling device and of the wireless remote control unit, in which "stop", "slow", or "free" signals are repeatedly transmitted from the wireless remote control unit to the controlling device, and in which a range limit may be applied.

FIG. 3:

FIG. 3 represents a second example of an embodiment of the controlling device 350 and of the wireless remote control unit 310, in which "stop", "slow", or "free" signals are repeatedly transmitted from the wireless remote control unit 310 to the controlling device 350, and in which a range limit may be applied. With this embodiment, if the controlling device 350 stops receiving the transmitted signals for any reason, it automatically forces the ride-on toy to stop.

Several buttons are installed on the wireless remote control unit 310, such as the Stop button 321, the Slow button 322, and the Free button 323. The user activates the said buttons in order to force the ride-on toy to stop, or to force the ride-on toy to slow down, or to enable the child a full control over the ride-on toy (namely, to give the child the freedom to drive the toy as he or she wishes), respectively. The signals related to the said buttons are applied to the Input logic circuit 320. The Input logic circuit 320 stores the information of the most recently activated button, and continuously applies the corresponding three signals to the data inputs of the RF Transmitter & Encoder circuit 330. Thus, one (and only one) of the three data inputs of the RF Transmitter & Encoder circuit 330 is asserted at a time, representing the most recently activated button. In addition, Input logic circuit 320, upon activation of any of the said buttons, generates a pressed pulse 335 and applies it to the Transmission trigger circuit 338. Upon detecting the pressed pulse 335, the transmission trigger circuit 338 generates a send pulse 340. Also, in absence of a pressed pulse 335, the Transmission trigger circuit 338 repeatedly generates send pulses 340, in predetermined time intervals. For example, the said predetermined time interval can be set to, say, every three seconds; however, a different value of time interval can be applied. Thus, send pulses 340 will be generated repeatedly in predetermined time intervals; however, a send pulse 340 will be generated immediately upon detection of the pressed pulse 335. The send pulses 340 is applied to the transmit enable input of the RF Transmitter & Encoder circuit 330. Consequently, the RF Transmitter & Encoder circuit 330, via variable gain controller circuit 345 and via Antenna-1 347, broadcasts an RF transmission, in which the information related to the most recently activated button is encoded. This transmission is continuously repeated in predetermined time intervals; however when a button is activated, a transmission is immediately broadcast. Said variable gain controller circuit 345, which may consist of an amplifier or an attenuator, is tuned by the user by means of a knob installed on the wireless remote control unit 310. By tuning the said gain controller, the user can determine the maximum distance from the wireless remote control unit 310 (the range), which the ride-on toy can travel before it is automatically stopped. This is because the controlling device 350 will automatically force the ride-on toy to stop, if and when it stops receiving signals, as will be explained below.

Said RF transmission reaches the controlling device 350, and is received by the RF Receiver & Decoder circuit 370 via Antenna-2 360. The RF Receiver & Decoder circuit 370 decodes the received information, and accordingly asserts one of its output signals 381 stop, slow, or free. In addition, the RF Receiver & Decoder circuit 370, upon decoding of said information, generates a strobe pulse 380 via its valid output. Said strobe pulse 380, along with the said stop, slow, free set of signals 381, are applied to the output logic circuit 390. Upon detection of the strobe pulse 380, output logic circuit 390 samples the stop, slow, free set of signals 381 and stores them. Consequently, said stored signals are applied via the toy-control set of output signals 395.

The said strobe pulse 380 is also applied to the Receive logic circuit 385. The Receive logic circuit 385 verifies that the strobe pulses 380 are repeatedly asserted. If no strobe pulse 380 is detected for a longer than a predetermined time-out period (for example, due to out-of-range conditions), then a lost signal 388 is asserted, and mains active until a predetermined number of continuous strobe pulses 380 is detected again. The said predetermined time-out period should be set to a value longer than the said predetermined time interval. To make the range-limit mechanism mom tolerant to randomly missing transmissions, a longer time-out period may be set. The said predetermined number of continuous strobe pulses should be set to at least one pulse. A higher value is recommended to avoid an on-and-off intermittent behavior due to marginal reception. The lost signal 388 is applied to the output logic circuit 390. As long as the lost signal 388 is active, an alert indicator (such as a beep sound) is set, and the output logic circuit 390 overrides its input signals 381, and forces the ride-on toy to stop via the toy-control set of output signals 395.

Implementation of all said circuits of this example of embodiment will be apparent to one skilled in the art. To ease the detailed design process, commercially available components may be used to implement the RF Transmitter & Encoder circuit 330. Likewise, commercially available components may be used to implement the RF Receiver & Decoder circuit 370.

Figure 4:
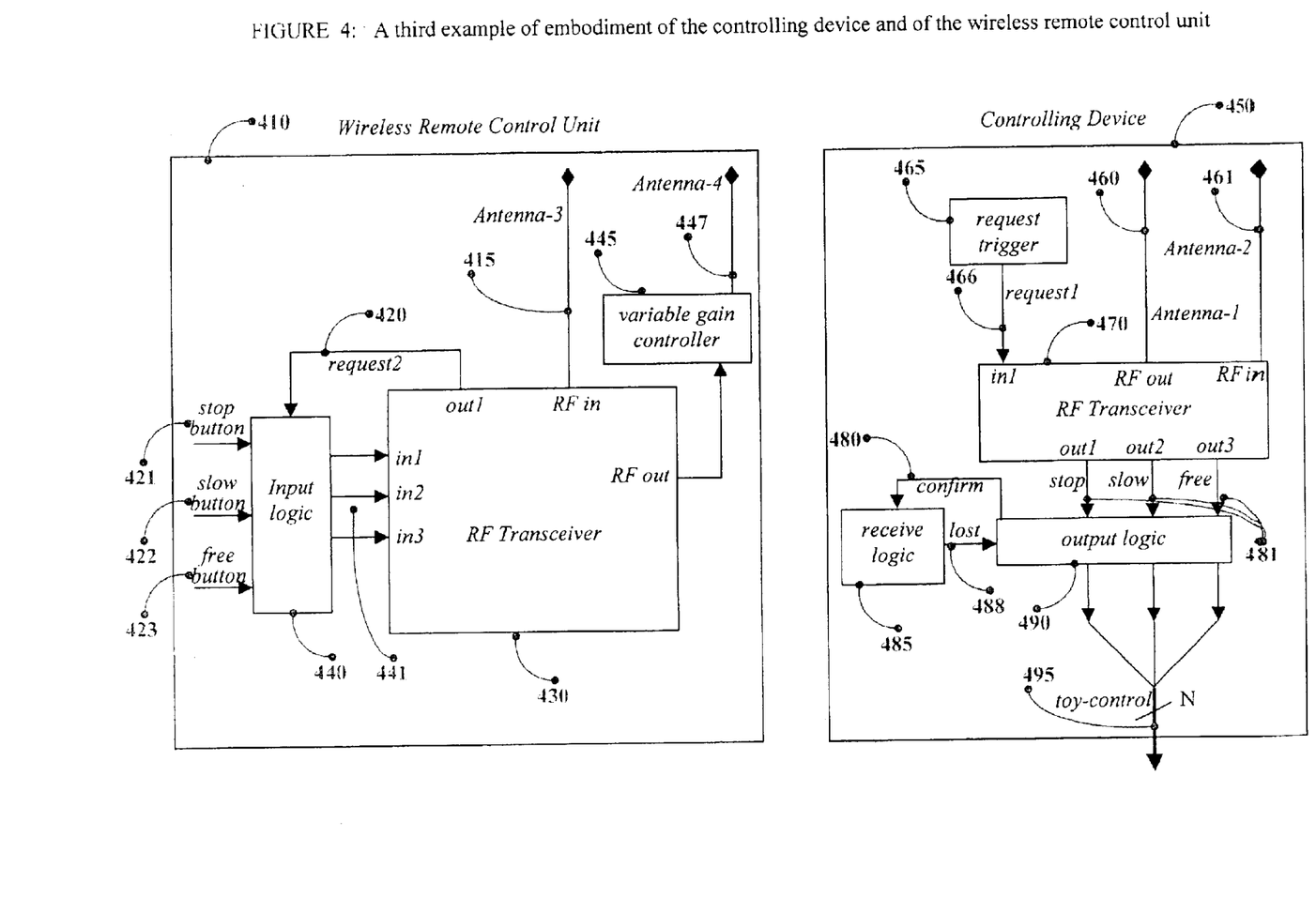
FIG. 4 represents a third example of an embodiment of the controlling device and of the wireless remote control unit, in which "requests" arc transmitted from the controlling device to the wireless remote control unit, and in which the wireless remote control unit transmits back "stop", "slow", or "free" signals, and in which a range limit may be applied by a variable gain control circuit.

FIG. 4:

FIG. 4 represents a third example of an embodiment of the controlling device 450 and of the wireless remote control unit 410, in which "requests" are repeated transmitted from the controlling device to the wireless remote control unit, and in which the wireless remote control unit transmits back "stop", "slow", or "free" signals, and in which a range limit may be applied by a variable gain control. With this embodiment, if the controlling device 450 stops receiving the transmitted signals for any reason, it automatically forces the ride-on toy to stop.

The request trigger circuit 465 of the controlling device 450 repeatedly generates request1 pulses 466, in predetermined time intervals. For example, the said predetermined time interval can be set to, say, every three seconds; however, a different value of time interval can be applied. The request1 pulse 466 is applied to the in1 input of the RF Transceiver circuit 470 of the controlling device 450. Consequently, the RF Transceiver circuit 470 via its RF out output and via Antenna-1 460, broadcasts an RF transmission, which indicates a request to the wireless remote control unit 410. This request indication is received by the RF Transceiver circuit 430 of the wireless remote control unit 410, via Antenna-3 415. Consequently, the AF Transceiver circuit 430 generates a request2 pulse 420 which is applied to the Input logic circuit 440. As a result, the information related to the most recently activated button will be transmitted back to the controlling device 450, as will be detailed below.

Several buttons are installed on the wireless remote control unit 410, such as the Stop button 421, the Slow button 422, and the Free button 423. The user activates the said buttons in order to force the ride-on toy to stop, or to force the ride-on toy to slow down, or to enable the child a full control over the ride-on toy (namely, to give the child the freedom to drive the toy as he or she wishes), respectively. The signals related to the said buttons are applied to the Input logic circuit 440. The Input logic circuit 440 stores the information of the most recently activated button. Upon detection of the request2 pulse 420 as detailed above, or immediately upon activation of any of the said buttons, the Input logic circuit 440 asserts its output pulse which corresponds to the most recently activated button. Said output pulse is one of the three pulses 441 applied to the in1,in2,in3 inputs of the RF Transceiver circuit 430, each of them corresponds to one of the three said buttons. Consequently, the RF Transceiver circuit 430, via variable gain controller circuit 445 and via Antenna-4 447, broadcasts an RF transmission, in which the information related to the most recently activated button is encoded. Thus, the said information will be transmitted immediately upon a button activation, and also periodically upon requests, as detailed above.

Said variable gain controller circuit 445, which may consist of an amplifier or an attenuator, is tuned by the user by means of a knob installed on the wireless remote control unit 410. By tuning the said gain controller, the user can determine the maximum distance from the wireless remote control unit 410 (the range), which the ride-on toy can travel before it is automatically stopped. This is because the controlling device 450 will automatically force the ride-on toy to stop, if and when it stops receiving signals, as will be explained below.

Said RF transmission reaches the controlling device 450, and is received by its RF Transceiver circuit 470 via Antenna-2 461. The RF Transceiver circuit 470 decodes the received information, and accordingly asserts one of its output pulses 481 stop, slow, or free. The said stop,slow, free set of pulses 481, are applied to the output logic circuit 490. Upon detection of one of the three said pulses, output logic circuit 490 stores the information related to the specific most recently asserted pulse (stop, slow, or free). Consequently, output logic circuit 490 applies the toy-control set of output signals 495, to indicate the specific most recently asserted pulse (stop, slow, or free).

Also, upon detection of one of said pulses, output logic circuit 490, applies the confirm pulse 480 to the receive logic circuit 485. The Receive logic circuit 485 verifies that the confirm pulses 480 are repeatedly asserted. If no confirm pulse 480 is detected for a longer than a predetermined time-out period (for example, due to out-of-range conditions), then a lost signal 488 is asserted and remains active until a predetermined number of continuous confirm pulses 480 is detected again. The said predetermined time-out period should be set to a value longer than the said predetermined time interval. To make the range-limit mechanism more tolerant to randomly missing transmissions, a longer time-out period may be set. The said predetermined number of continuous confirm pulses should be set to at east one pulse. A higher value is recommended to avoid an on-and-off intermittent behavior due to marginal reception. The lost signal 488 is applied to the output logic circuit 490. As long as the lost signal 488 is active, the output logic circuit 490 overrides its previously stored signals, and forces the ride-on toy to stop via the toy-control set of output signals 495. Also, as long as the lost signal 488 is active, an alert indicator (such as a beep sound) is set. The alert indication can also be transmitted to the wireless remote control unit 410 to set an alert indicator there.

Implementation of all said circuits of this example of embodiment will be apparent to one skilled in the art. To ease the detailed design process, commercially available components may be used to implement the AF Transceiver circuits 430 and 470.

Figure 5:
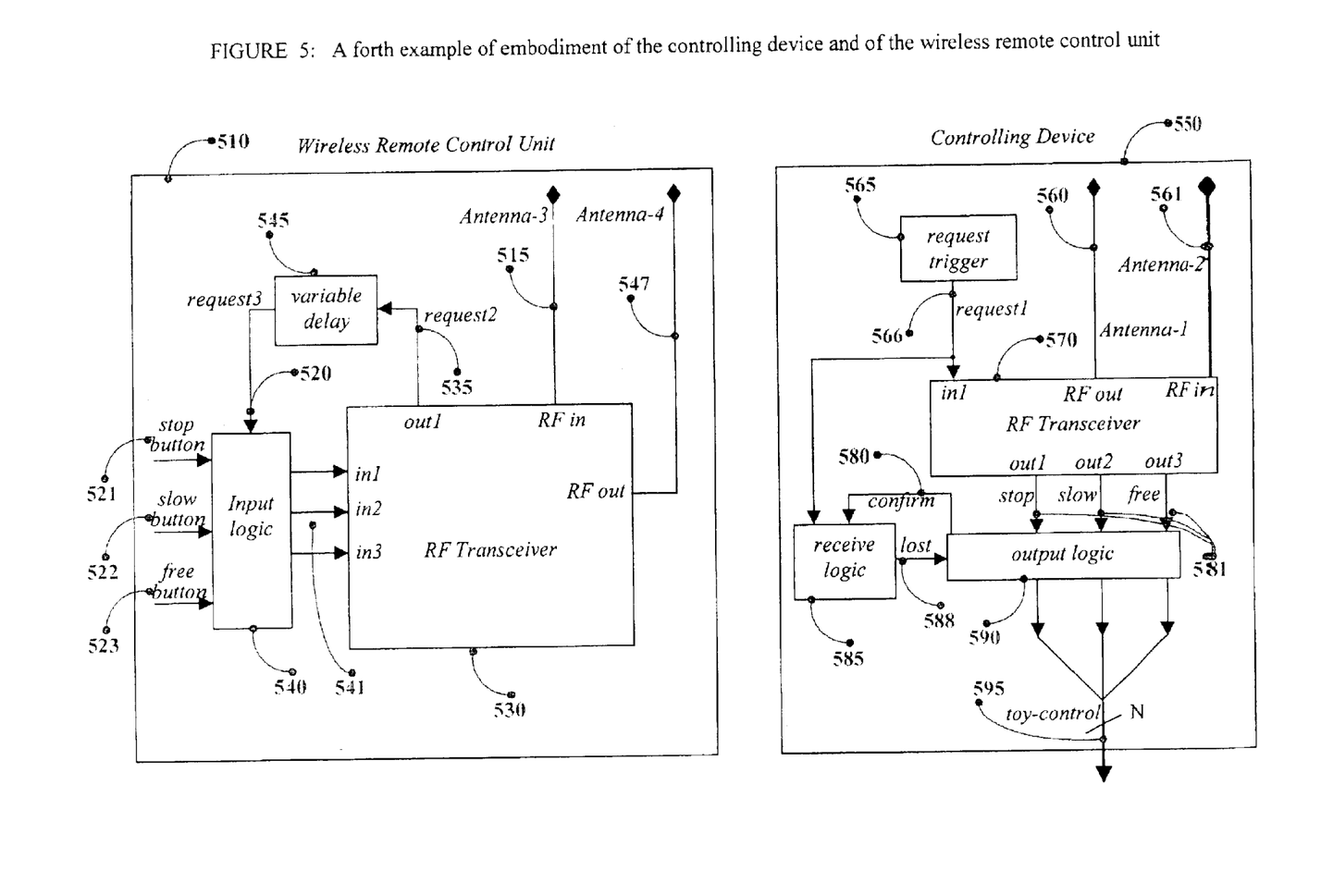
FIG. 5 represents a fourth example of an embodiment of the controlling device and of the wireless remote control unit, in which "requests" are transmitted from the controlling device to the wireless remote control unit, and in which the wireless remote control unit transmits back "stop", "slow", or "free" signals, and in which a range limit may be applied by a variable delay circuit.

FIG. 5:

FIG. 5 represents a fourth example of an embodiment of the controlling device 550 and of the wireless remote control unit 510, in which "request" are transmitted from the controlling device to the wireless remote control unit, and in which the wireless remote control unit transmits back "stop", "slow", or "free" signals, and in which a range limit may be applied by a variable delay circuit. With this embodiment, if the controlling device 550 stops receiving the transmitted signals for any reason, or if transmitted signals are over-delayed, it automatically forces the ride-on toy to stop.

The request trigger circuit 565 of the controlling device 550 repeatedly generates request1 pulses 566, in predetermined time intervals. For example, the said predetermined time interval can be set to, say, every three seconds; however, a different value of time interval can be applied. The request1 pulse 566 is applied to the receive logic circuit 585, so that said circuit can measure the time delay between the request1 pulse 566 and the confirm pulse 580, as will be detailed below. The request1 pulse 566 is also applied to the in1 input of the RF Transceiver circuit 570 of the controlling device 550.

Consequently, the RF Transceiver circuit 570 via its RF out output and via Antenna-1 560, broadcasts an RF transmission, which indicates a request to the wireless remote control unit 510. This request indication is received by the RF Transceiver circuit 530 of the wireless remote control unit 510, via Antenna-3 515. Consequently, the RF Transceiver circuit 530 generates a request2 pulse 535 which is applied to the variable delay circuit 545. Consequently, after a predetermined time delay (which is fixed by the user), the variable delay circuit 545 applies a request3 pulse 520 to the Input logic circuit 540. As a result, the information related to the most recently activated button will be transmitted back to the controlling device 550, as will be detailed below. Said variable delay circuit 545, is tuned by the user by means of a knob installed on the wireless remote control unit 510. By tuning the delay, the user can determine the maximum distance from the wireless remote control unit 510 (the range), which the ride-on toy can travel before it is automatically stopped. This is because the controlling device 550 will automatically force the ride-on toy to stop, if and when it stops receiving signals, or if the signals are over-delayed, as will be detailed below.

Several buttons are installed on the wireless remote control unit 510, such as the Stop button 521, the Slow button 522, and the Free button 523. The user activates the said buttons in order to force the ride-on toy to stop, or to force the ride-on toy to slow down, or to enable the child a full control over the ride-on toy (namely, to give the child the freedom to drive the toy as he or she wishes), respectively. The signals related to the said buttons are applied to the Input logic circuit 540. The Input logic circuit 540 stores the information of the most recently activated button. Upon detection of the request3 pulse 520 as detailed above, or immediately upon activation of any of the said buttons, the Input logic circuit 540 asserts its output pulse which corresponds to the most recently activated button. Said output pulse is one of the three pulses 541 applied to the in1,in2,in3 inputs of the RF Transceiver circuit 530. Each one of said three pulses corresponds to one of the three said buttons. Consequently, the RF Transceiver circuit 530, via Antenna-4 547, broadcasts an RF transmission, in which the information related to the most recently activated button is encoded. Thus, the said information will be transmitted immediately upon a button activation, and also periodically upon requests, as detailed above.

Said RF transmission reaches the controlling device 550, and is received by its RF Transceiver circuit 570 via Antenna-2 561. The RF Transceiver circuit 570 decodes the received information, and accordingly asserts one of its output pulses 581 stop, slow, or free. The said stop,slow,free set of pulses 581, are applied to the output logic circuit 590.

Upon detection of one of the tree said pulses, output logic circuit 590 stores the information related to the specific most recently asserted pulse (stop, slow, or free). Consequently, output logic circuit 590 applies the toy-control set of output signals 595, to indicate the specific most recently asserted pulse (stop, slow, or fee). Also, upon detection of one of said pulses, output logic circuit 590 applies the confirm pulse 580 to the receive logic circuit 585. Said circuit measures the time delay between the request1 pulse 566 and the confirm pulse 580.

Said time delay is a summation of the following three time-delay components:

(a) The total round-trip propagation delay time of the signals within: RF Transceiver circuit 570 (transmit path), RF Transceiver circuit 530 (receive path), Input logic circuit 540, RF Transceiver circuit 530 (transmit path), RF Transceiver circuit 570 (receive path) and output logic circuit 590.

(b) The round-trip propagation delay time of the RF signals in the air. This component linearly depends on the distance between the ride-on toy and the wireless remote control unit 510.

(c) The propagation delay time within the variable delay circuit 545.

The Receive logic circuit 585 verifies that the confirm pulse 580 is asserted within a predetermined allowed time window after the request1 pulse 566. The said predetermined allowed time window should be set to be equal to the total round-trip propagation delay time of the signals within the circuits as listed above in (a), plus the maximum round-trip propagation delay time of the RF signals in the air as specified above in (b) assuming maximum allowed distance between the ride-on toy and the wireless remote control unit 510. This means that with the maximum allowed said distance, and with the variable delay circuit 545 tuned to zero delay, the confirm pulse 580 will marginally meet the limit of the said predetermined allowed time window. Thus, increasing the tuned propagation delay time of the variable delay circuit 545, will reduce the allowed distance between the said toy and the said remote control unit in order to meet the limit of the said predetermined allowed lime window. This is how the user can apply the range limit of the ride-on toy. By tuning the variable delay circuit 545 for a longer time delay, the allowed range is reduced.

If no confirm pulse 580 is detected within the limit of the said predetermined allowed time window, and if confirm pulses are persistently missing, as described, for a predetermined number of continuous missing pulses (typically due to out-of-range conditions), then a lost signal 588 is asserted. Said lost signal remains active until a confirm pulse 580 is again detected within the limit of the said predetermine allowed time window. The said predetermined number of continuous missing pulses should be set to at least one missing pulse. A higher value may be applied to make the range-limit mechanism more tolerant to randomly missing transmissions. The last signal 588 is applied to the output logic circuit 590. As long as the lost signal 588 is active, the output logic circuit 590 overrides its previously stored signals, and forces the ride-on toy to stop via the toy-control set of output signals 595. Also, as long as the lost signal 588 is active, an alert indicator (such as a beep sound) is set. The alert indication can also be transmitted to the wireless remote control unit 510 to set an alert indicator there.

Implementation of all said circuits of this example of embodiment will be apparent to one skilled in the art. To ease the detailed design process, commercially available components may be used to implement the RF Transceiver circuits 530 and 570.

Optionally for all above examples of embodiments represented in FIGS. 2,3,4 and 5, the said wireless remote control unit, with the controlling device, may be implemented so that selected "essential" control function instructions (e.g., "stop" instruction) will operate over a distance that is longer than a maximal distance allowed for "non-essential" control function instructions to operate. This can be implemented, for example, by connecting negatively biased diodes between the transmission Antenna (240, 347, 447 or 547) and the buttons or signals activating the "non-essential" control function such as the Free button or signal. Implementation of this optional circuit will be apparent to one skilled in the art.

Figure 6:
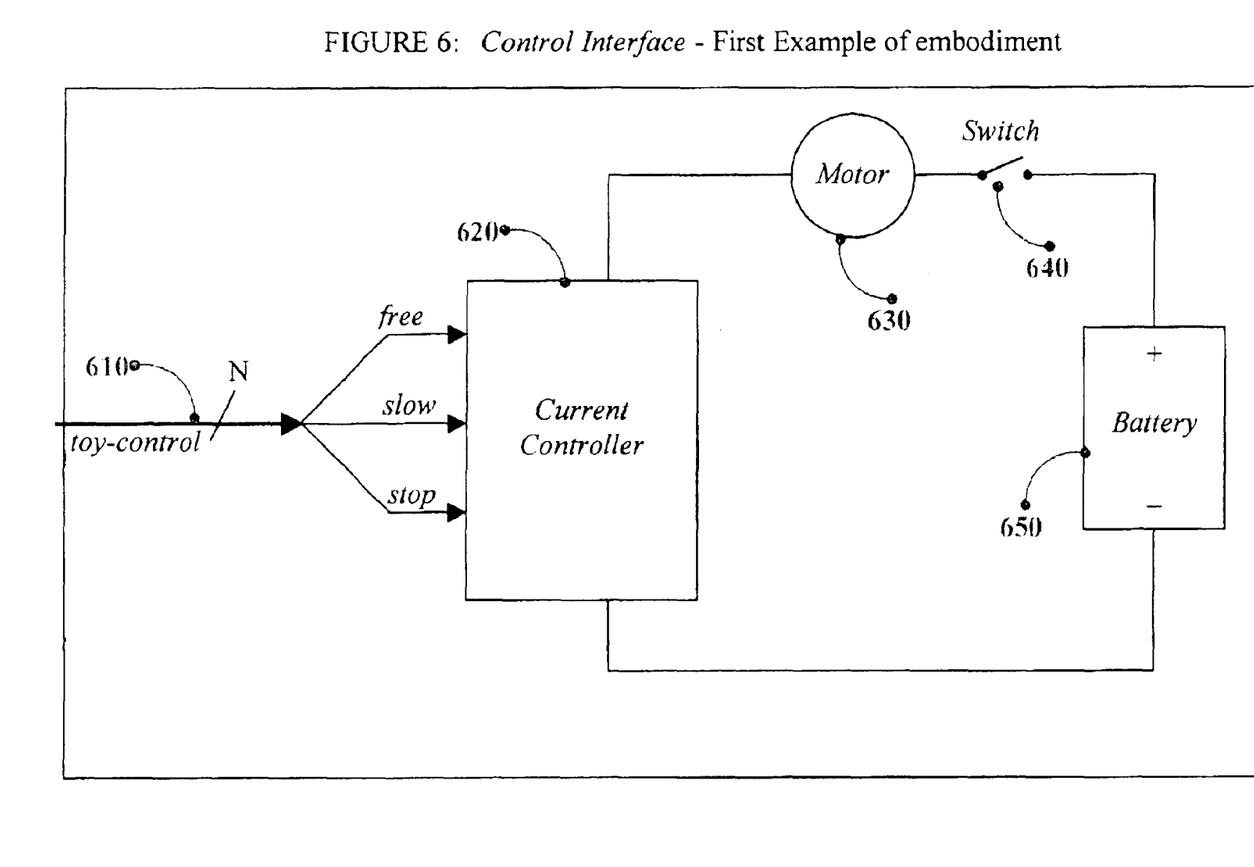
FIG. 6 represents an example of an embodiment of the control interface, in which the control interface controls the current applied to the motor.

FIG. 6:

FIG. 6 represents an example of an embodiment of the control interface, in which the control interface controls the current applied to the motor. This example of embodiment applies to an otherwise conventional battery-powered ride-on toy, wherein a battery 650 is connected to a motor 630 via a switch 640. With this example of embodiment implemented, a Current Controller circuit 620 is connected in series to the motor 630. The said Current Controller circuit 620 is controlled by the toy-control set of signals 610 (applied by the controlling device), which consists of the free signal, the slow signal, and the stop signal. Only one of the said three signals may be active at a time. As long as the free signal is active, the Current Controller circuit 620 allows maximum current flow, thus allowing the child to drive the toy freely. As long as the stop signal is active, the Current Controller circuit 620 does not allow any current flow, thus forcing the ride-on toy to stop. As long as the slow signal is active, the Current Controller circuit 620 allows reduced current flow, thus forcing the ride-on toy to slow down.

Implementation of the said Current Controller circuit 620, which typically consists of a few resistors, and transistors or relays, will be apparent to one skilled in the art.

Figure 7:
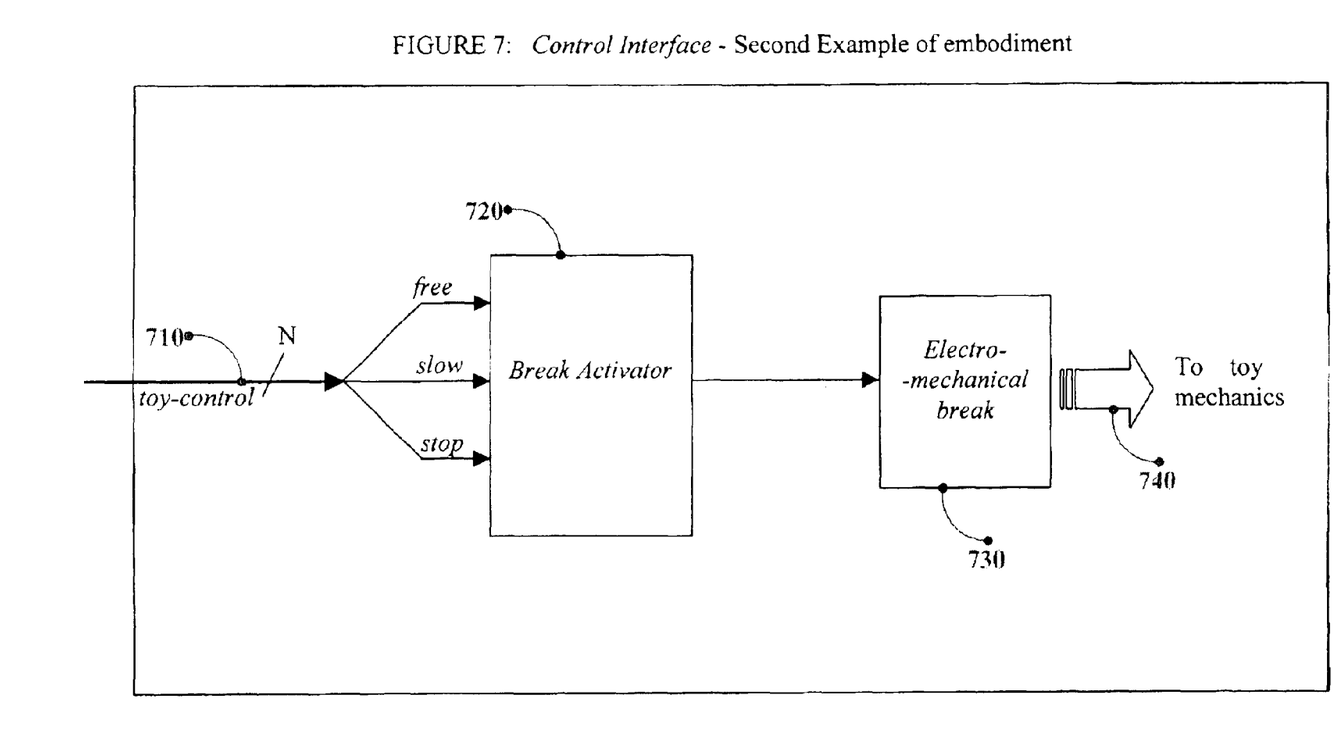
FIG. 7 represents a second example of an embodiment of the control interface, in which the control interface applies an electro-mechanical break.

FIG. 7:

FIG. 7 represents a second example of an embodiment of the control interface, in which the control interface activates an electro-mechanical break. This example of embodiment applies to an otherwise conventional foot-powered ride-on toy.

An electro-mechanical break 730 which typically consists of a battery powered solenoid or electro-magnet, is coupled to certain mechanical parts of the ride-on toy (such as wheels, axle or shaft) via a coupler 740, which typically consists of a friction surface. Implementation of the electro-mechanical break 730, and of the coupler 740, will be apparent to one skilled in the art.

The said electro-mechanical break 730 is activated by a Break Activator circuit 720. The said Break Activator circuit 720 is controlled by the toy-control set of signals 710 (applied by the controlling device), which consists of the free signal, the slow signal, and the stop signal. Only one of the said three signals may be active at a time. As long as the free signal is active, the Beak Activator circuit 720 does not activate the electro-mechanical break 730 at all thus allowing the child to drive the toy freely. As long as the stop signal is active, the Break Activator circuit 720 fully activates the electro-mechanical break 730, thus forcing the ride-on toy to stop.

As long as the slow signal is active, the Break Activator circuit 720 partially activates the electro-mechanical break 730, thus forcing the ride-on toy to slow down. Implementation of the said Break Activator circuit 720 will be apparent to one skilled in the art.

In the foregoing specification the invention bas been described with reference to specific examples of embodiments thereof. It will, however, be evident that various modifications and changes may be made thereto without departing from what is regarded to be the subject matter of the invention, or the broader spirit and scope of the invention. The specification and drawings are, accordingly, to be regarded in an illustrative rather than restrictive sense.

What is claimed is:

1. A toy system to be used by a child or children; said toy system comprising:
    a) a ride-on toy; said ride-on toy foot powered, or battery powered, or gasoline powered, or otherwise powered; said ride-on toy is equipped with a toy control unit; said toy control unit is equipped to perform wireless communication with a wireless remote control unit; said wireless communication use an RF (radio frequency) communication, or an IR (infra-red) communication, or any other type of wireless communication;
    b) a wireless remote control unit; said wireless remote control unit is equipped to perform wireless communication with said toy control unit; said wireless communication use an RF (radio frequency) communication, or an IR (infra-red) communication, or any other type of wireless communication;
    wherein the said toy control unit is further equipped to perform at least one control function over the said ride-on toy;
    and wherein the said wireless remote control unit is further equipped to instruct the said toy control unit, via wireless communication, to perform said control functions;
    and wherein selected essential control function instructions will operate over a distance that is longer than a maximal distance allowed for non essential control function instructions to operate.

2. The toy system as set forth in claim 1, wherein the said control functions include making the said ride-on toy stop.

3. The toy system as set forth in claim 1, wherein the said control functions include making the said ride-on toy slow down.

4. The toy system as set forth in claim 1, wherein the said control functions include enabling the said ride-on toy to be operated freely.

5. A toy system to be used by a child or children; said toy system comprising:
    a) a ride-on toy; said ride-on toy foot powered, or battery powered, or gasoline powered, or otherwise powered; said ride-on toy is equipped with a toy control unit; said toy control unit is equipped to perform wireless communication with a wireless remote control unit; said wireless communication use an RF (radio frequency) communication, or an IR (infra-red) communication, or any other type of wireless communication;
    b) a wireless remote control unit; said wireless remote control unit is equipped to perform wireless communication with said toy control unit; said wireless communication use an RF (radio frequency) communication, or an IR (infra-red) communication, or any other type of wireless communication;
    wherein the said toy control unit with said wireless remote control unit are further equipped to detect the distance between the said ride-on toy and said wireless remote control unit; said distance is detected by sensing the power of the received wireless communication signals, or by measuring the round-trip communication propagation delay time.

6. The toy system as set forth in claim 5, wherein the said toy control unit with said wireless remote control unit are further equipped to set a predetermined limit over said distance; said limit can be factory set, or can be fixed by the user.

7. The toy system as set forth in claim 6, wherein the said toy control unit or said wireless remote control unit are further equipped to indicate an alert when the said distance reaches the said limit.

8. The toy system as set forth in claim 6, wherein the said toy control unit is further equipped to make the said ride-on toy stop when the said distance reaches the said limit.

9. A method for remotely controlling a ride-on toy; said ride-on toy equipped with a toy control unit; said ride-on toy foot powered, or battery powered, or gasoline powered, or otherwise powered; said method comprising:
    a) setting at least one controlling instruction by operating a wireless remote control unit;
    b) exchanging information between the said wireless remote control unit and the said toy control unit performing wireless communication; said wireless communication use an RF (radio frequency) communication, or an IR (infra-red) communication, or any other type of wireless communication;
    c) activating at least one control function over the ride-on toy;
    wherein selected essential control function instructions will operate over a distance that is longer than a maximal distance allowed for non essential control function instructions to operate.

10. The method as set forth in claim 9, wherein the said control functions include making the said ride-on toy stop.

11. The method as set forth in claim 9, wherein the said control functions include making the said ride-on toy slow down.

12. The method as set forth in claim 9, wherein the said control functions include enabling the said ride-on toy to be operated freely.

13. A ride-on-toy-controlling-system whereby one may gain some control over a ride-on toy; said ride-on-toy-controlling-system comprising:

a) a toy control unit; said toy control unit is adapted to be installed within a ride-on toy; said toy control unit is equipped to perform wireless communication with a wireless remote control unit; said wireless communication use an RF (radio frequency) communication, or an IR (infra-red) communication, or any other type of wireless communication;

b) a wireless remote control unit; said wireless remote control unit is equipped to perform wireless communication with said toy control unit; said wireless communication use an RF (radio frequency) communication, or an IR (infra-red) communication, or any other type of wireless communication;

wherein the said toy control unit is further equipped to perform at least one control function over the said ride-on toy;

and wherein the said wireless remote control unit is further equipped to instruct the said toy control unit, via wireless communication, to perform said control functions;

and wherein selected essential control function instructions will operate over a distance that is longer than a maximal distance allowed for non essential control function instructions to operate.

14. A toy system to be used by a child or children; said toy system comprising:

a) a ride-on toy; said ride-on toy foot powered, or battery powered, or gasoline powered or otherwise powered; said ride-on toy is equipped with a toy control unit; said toy control unit is equipped to perform wireless communication with a wireless remote control unit; said wireless communication use an RF (radio frequency) communication, use an IR (infra-red) communication, or any other type of wireless communication;

b) a wireless remote control unit; said wireless remote control unit is equipped to perform wireless communication with said toy control unit; said wireless communication use an RF (radio frequency) communication, or an IR (infra-red) communication, or any other type of wireless communication;

wherein the said toy control unit is further equipped to perform at least one control function over the said ride-on toy;

and wherein the said wireless remote control unit is further equipped to instruct the said toy control unit, via wireless communication, to perform said control functions;

and wherein said wireless remote control unit with said toy control unit are further equipped to perform said wireless communication automatically and repeatedly;

and wherein said toy control unit is further equipped to automatically perform at least one control function over said ride-on toy in case said wireless communication is not received.

15. A method for remotely controlling a ride-on toy; said ride-on toy equipped with a toy control unit; said ride-on toy foot powered, or battery powered, or gasoline powered, or otherwise powered; said method comprising:

a) setting the controlling instructions by operating a wireless remote control unit;

b) repeatedly and automatically performing wireless communication between said wireless remote control unit and said toy control unit; said wireless communication use an RF (radio frequency) communication, or an IR (infra-red) communication, or any other type of wireless communication;

c) said toy control unit automatically activating at least one control function over said ride-on toy in case said wireless communication is not received;

d) said toy control unit activating at least one control function over said ride-on toy, according to instructions received via said wireless communication.

16. A ride-on-toy-controlling-system whereby one may gain some control over a ride-on toy; said ride-on-toy-controlling-system comprising:

a) a toy control unit; said toy control unit is adapted to be installed within a ride-on toy; said toy control unit is equipped to perform wireless communication with a wireless remote control unit; said wireless communication use an RF (radio frequency) communication, or an IR (infra-red) communication, or any other type of wireless communication;

b) a wireless remote control unit; said wireless remote control unit is equipped to perform wireless communication with said toy control unit; said wireless communication use an RF (radio frequency) communication, or an IR (infra-red) communication, or any other type of wireless communication;

wherein the said toy control unit is further equipped to perform at least one control function over the said ride-on toy;

and wherein the said wireless remote control unit is further equipped to instruct the said toy control unit, via wireless communication, to perform said control functions;

and wherein said wireless remote control unit with said toy control unit are further equipped to perform said wireless communication automatically and repeatedly;

and wherein said toy control unit is further equipped to automatically perform at least one control function over said ride-on toy in case said wireless communication is not received.

* * * * *

UNITED STATES PATENT AND TRADEMARK OFFICE
CERTIFICATE OF CORRECTION

PATENT NO.     : 6,915,871 B2
DATED          : September 21, 2005
INVENTOR(S)    : Dan Gavish and Hanna Gavish It is certified that error appears in the above-identified patent and that said Letters Patent is hereby corrected as shown below:

<u>Column 1, line 5 through Column 14, line 58,</u>
Each occurrence of "break", should read -- brake --.

<u>Column 3,</u>
Line 49, "arc" should be changed to -- are --.

<u>Column 4,</u>
Line 14, "ride-n" should be changed to -- ride-on --;
Line 22, "arc" should be changed to -- are --.

<u>Column 5,</u>
Line 1, "fill" should be changed to -- full --;
Line 21, "ad" should be changed to -- said --.

<u>Column 6,</u>
Line 40, "mains" should be changed to -- remains --;
Line 45, "mom" should be changed to -- more --;
Line 66, "repeated" should be changed to -- repeatedly --.

<u>Column 7,</u>
Line 19, "AF" should be changed to -- RF --.

<u>Column 8</u>
Line 18, "east" should be changed to -- least --;
Line 31, "AF" should be changed to -- RF --.

<u>Column 9</u>
Line 39, "tree" should be changed to -- three --;
Line 44, "fee" should be changed to -- free --.

UNITED STATES PATENT AND TRADEMARK OFFICE
CERTIFICATE OF CORRECTION

PATENT NO.   : 6,915,871 B2
DATED        : September 21, 2005
INVENTOR(S)  : Dan Gavish and Hanna Gavish It is certified that error appears in the above-identified patent and that said Letters Patent is hereby corrected as shown below:

Column 10,
Line 13, "lime" should be changed to -- time --;
Line 23, "predetermine" should be changed to -- predetermined --;
Line 28, "last" should be changed to -- lost --.

Column 11,
Line 28, "Beak" should be changed to -- Brake --;
Line 39, "bas" should be changed to -- has --.

Signed and Sealed this

Twenty-second Day of November, 2005

JON W. DUDAS
*Director of the United States Patent and Trademark Office*